United States Patent [19]

Nakayama

[11] 4,426,752
[45] Jan. 24, 1984

[54] ROTOR MOVEMENT DAMPING DEVICE
[75] Inventor: Hiromichi Nakayama, Yokohama, Japan
[73] Assignee: Nifco, Inc., Tokyo, Japan
[21] Appl. No.: 273,835
[22] Filed: Jun. 15, 1981
[30] Foreign Application Priority Data Jun. 16, 1980 [JP] Japan .............................. 55-82888[U]

[51] Int. Cl.³ .............................................. E05F 5/02
[52] U.S. Cl. .................... 16/82; 16/DIG. 9; 188/271; 188/290; 277/27; 277/152
[58] Field of Search ................... 16/51, 54, 55, 57, 76, 16/77, 82, 83, 84, DIG. 9; 277/3, 27, 152; 188/271, 290

[56] References Cited
U.S. PATENT DOCUMENTS 842,639   1/1907  Emden .................................. 277/27
4,342,135 8/1982  Matsuo et al. .................. 188/290 X

FOREIGN PATENT DOCUMENTS 233429 7/1944 Switzerland .......................... 277/27

Primary Examiner—Howard N. Goldberg
Assistant Examiner—Fred A. Silverberg
Attorney, Agent, or Firm—Jerold M. Forsberg; Thomas W. Buckman

[57] ABSTRACT

A rotary damping device has a shaft provided at one end with a rotor and the shaft also has a damping portion extending radially. The shaft is rotatably housed and accommodation spaces in the device are filled with oil. Located near to the opening of the shaft bearing is a radially extended sucker-shaped flange having a surface sloped axially forward. When the flange is contained within the accommodation space the rim portion of the flange presses against the front wall of the space to prevent damping oil leaking from the housing.

1 Claim, 5 Drawing Figures

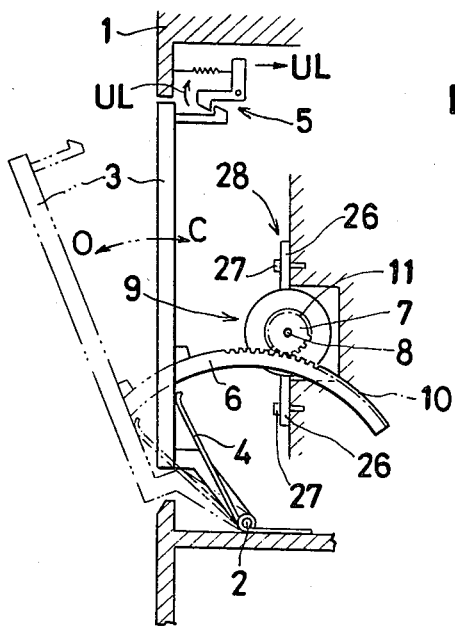
Fig_1
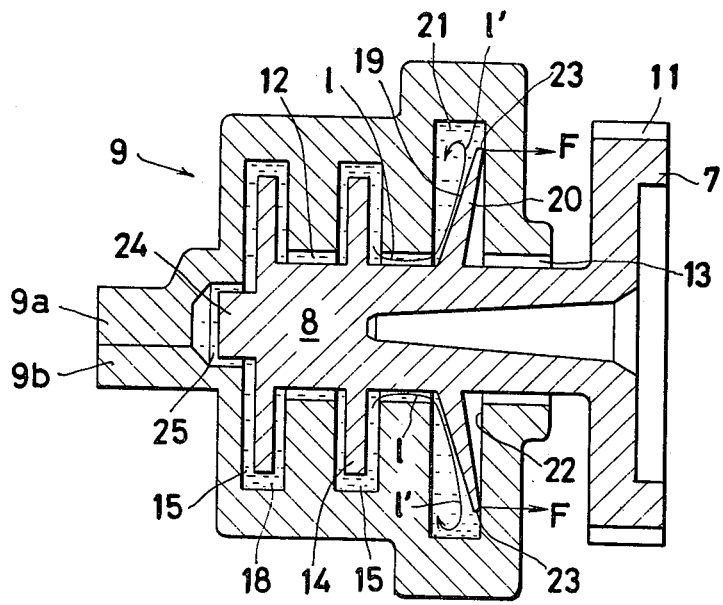
Fig_3

ROTOR MOVEMENT DAMPING DEVICE

BACKGROUND OF THE INVENTION

This invention relates to a device for damping a rotor engaging with a part such as the lid of the cassette holder in a cassette tape recorder or deck so as to thereby damp the movement of such a part.

Generally, the mechanism for opening and closing the lid for the cassette holder in a cassette tape recorder is so designed that a push given to an eject button causes a spring to snap open the lid. When the lid is opened, the energizing force of the spring acts wholly upon the lid and causes the lid to open abruptly and, after the lid has reached the limit of its stroke, causes the lid to vibrate. When the lid is closed with the force of the finger tip from its opened position, the resisting force of the spring acts directly on the finger and gives an unpleasant sensation. In any event, the conventional devices do not give the impression of being sophisticated mechanisms.

Many attempts have heretofore been made to develop devices capable of properly moderating the movement of a lid, causing the lid, on release from its closed position, to be opened smoothly yet steadily and slowly and, on return to its closed position, to be closed with a proper positive sensation. Among the various devices developed for the control of lid movement, typical are those making use of mechanical frictional force and those incorporating rods in cylinders filled with oil. The devices of the former type have a constitutional problem in that the smoothness with which the lid movement is slowed or stopped is not sufficient and a disadvantage that their component parts tend to squeak because of friction. In that case of the devices of the latter type, since the linear motion of the piston causes the oil contained within the cylinder to move violently within the cylinder interior, the seal tends to be damaged often to the extent of causing oil leakage. Besides, these devices, as a whole, are apt to occupy large amounts of space. Worse still, these devices comprise numerous parts and, therefore, inevitably require much time and labor at the time of their assembly and prove expensive in many respect.

Other devices aimed at moderating lid movement by converting the movement into a rotation around an axis and damping the force of this rotation by means of an oil disposed around the axis of rotation have been also developed. In principle, the devices of this type are capable of producing a moderating force with a highly pleasing sensation. All the efforts made to minimize the number of component parts, however, have been unsuccessful in the devices of this type so far developed. Most of these devices require at least three or four component parts, which are difficult to shape and assemble.

SUMMARY OF THE INVENTION

The object of the present invention is to provide a rotary oil damping device with a greater oil sealing action.

In order to attain this object, the rotary damping device according to the present invention is provided with a shaft having at one end a rotor and possessing at least one damper portion which is larger in the radial direction than the shaft, the said shaft also being provided with, at a point near to the opening of the space in which the shaft is borne, a sucker-shaped flange extending radially and having a sloping surface inclined toward the front of the shaft. The sucker-shaped flange is arranged in an accommodating space provided within a plastic housing so that when the space is filled with damping oil the rim of the sloping surface of the said flange adheres to the front wall of the said accommodating space, so that even when the damping oil is subjected to stress, the force will act on the obverse surface of the flange, thereby increasing the flange adhesion so that no damping oil leaks out from the housing.

The other objects and features of the invention will be clear from the following detailed explanation made in reference to the attached drawings.

BRIEF EXPLANATION OF THE DRAWING

FIG. 1 is a schematic view showing an example of a rotary damping device for a lid;

FIG. 3 is a sectional view showing an embodiment of the rotor movement damping device in accordance with the present invention.

DESCRIPTION OF PREFERRED EMBODIMENT

Figure 2A:
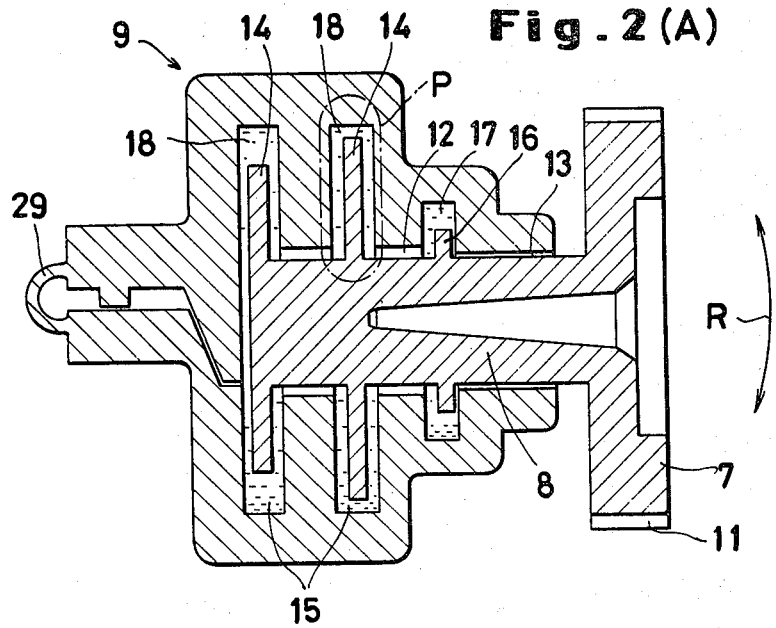
FIG. 2(A) is a sectional view of a conventional prior art damping device.

A device for damping the opening and closing movement of a lid will be described in outline with reference to FIG. 1. A common method used in damping devices is to have a housing 1 within which a lid 3 is movably mounted on a support 2 to allow the lid to open or close, and an appropriate spring means 4 which exerts a constant opening-direction urge (arrow "0") on the lid 3. When lid 3 is in the closed position, the action of a locking means 5 maintains the lid in the closed position against the opening force of the spring 4, so that by operating a separately provided means of lock release such as a button (not shown), the lid 3 is opened by the energizing force of the spring 4.

However, in such a construction, as it stands, the total force of the spring acts upon the lid when the lid is opened causing the lid to open abruptly and rebound at the end of its travel. Also, when the lid is pushed closed by finger (arrow "C"), the resistance of the spring 4 is transmitted directly to the finger, giving unpleasant feel to the action. In any event, the impression is that the device lacks precision as a mechanism.

Many attempts have heretofore been made to develop devices capable of properly moderating the movement of a lid, causing the lid, on release from its closed position, to be opened smoothly yet steadily and slowly and, on return to its closed position, to be closed with a proper positive sensation. Among the various devices are those which convert the lid motion into rotation around an axis and damp this rotation by means of oil. In principle the devices of this type are capable of providing a moderating force with a highly pleasing sensation. Such a damping device has been disclosed in Japanese Utility Model Applicaion Public Disclosure No. 56002/1981, in which, as also shown in FIG. 1, at least one surface of an element 6 which moves integrally with the lid 3 engages a rotor 7 of a shaft 8 which is damped by means of oil, the rotor 7 and the shaft 8 and the damping oil being substantially contained within a housing 9.

In the device shown in FIG. 1, the moving element 6 is in the shape of an arc and is provided with a rack portion 10 on its surface which engages with the rotor 7, while the periphery of the rotor 7 is formed into a pinion 11 to engage said rack 10, so that as the lid 3 opens or closes the rotor 7 rotates in direct response to the movement of the arc shaped element 6. Expressed differently, any damping force applied to the rotor 7 will be adequately transmitted to the lid 3 via the arc shaped element 6. However, this geared arrangement is not the only one used and any type of frictional engagement between the arc shaped element and the rotor is sufficient. Moreover, there are also cases where the element 6 need not be arc shaped.

This type of rotary damping device is superior to other types as it requires fewer component parts and has less oil leakage, but even so it has not been possible to effect perfect sealing against oil leaking from the opening in the housing provided for the shaft of the rotor. More precisely, in previous devices although sufficient sealing effect could be obtained in a static design state, under the dynamic conditions of actual use there occurred oil leakage.

For this invention fundamental improvements were made in consideration of such oil leakage, and study into the mechanism of oil leakage in a dynamic situation resulted in a rotary oil damping device which gives a better oil sealing action particularly in dynamic conditions.

First, conventional damping devices of this type together with the oil leakage mechanism will be analyzed with reference to FIG. 2.

In the cross-section of FIG. 2(A), a shaft 8 having at one end a rotor portion 7 is held in a bearing space 12 axially arranged within a housing 9, so that only the rotor portion 7 is exposed beyond the opening edge 13 of the space 12. The periphery of the rotor 7 is provided with a pinion means 11 to engage with the moving element 6 of a lid, as previously described. Shaft 8 is integrally provided with at least one pair of radially larger portions 14 such as discs or vanes which are generally spaced axially, while the housing 9 contains spaces 15 within each of which is a larger portion 14 and which are larger both axially and radially than the said portions 14. The spaces 15 are filled with a high-viscosity damping oil or grease 18 so that the rotation of larger portions 14 is damped by viscous resistance and this damping force is transmitted from the shaft 8 to the rotor 7.

Furthermore, even in conventional devices a small disc 16 is provided fore of the larger portions 14 for sealing purposes, there being also for this small disc 16 a space 17 disposed radially into the housing, the design being to prevent the oil 18 beyond the small disc 16 from communicating axially along bearing space 12 and leaking out from the opening 13.

To form the necessary contours of the above-described spaces in the housing, the housing is generally formed of plastic in two halves 9a and 9b which are aligned one on the other to make the housing. The usual method used for this is to integrally form the housing with the two halves 9a and 9b in the open position and connected either side-by-side or, as in FIG. 2, end-to-end by a clamping hinge 29, with the halves 9a and 9b being subsequently aligned about the hinge 29 to assemble the housing. After assembly sonic welding can be used along the line of contact between the halves 9a and 9b, if required, to prevent oil leaking from the joint.

Figure 2B:
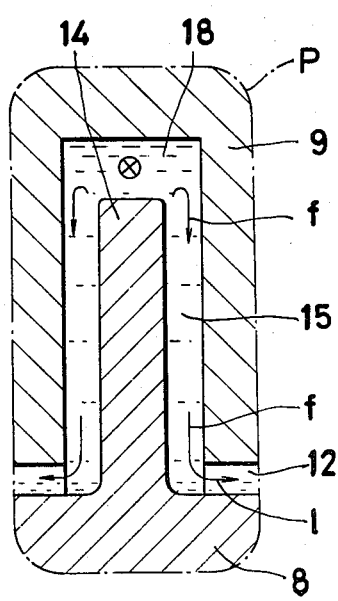
FIGS. 2(B) and (C) show enlargement of sections of prior art FIG. 2(A) and are for explaining the mechanism of damping oil leakage.
Figure 2C:
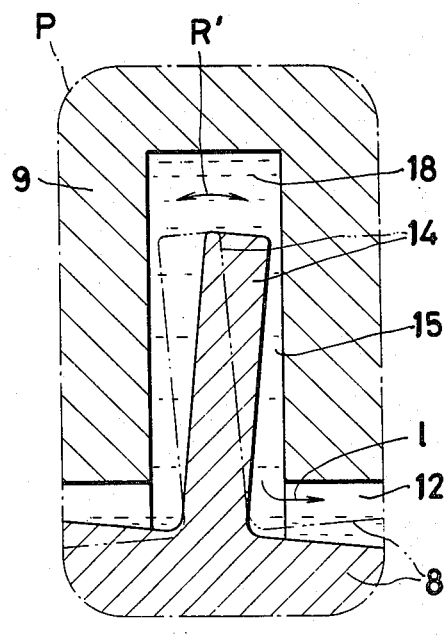

In order to describe the mechanism of oil leakage an oval section enclosed in FIG. 2(A) by the chain line "P" and being one of the larger portions 14 and a corresponding space 15 is shown enlarged FIGS. 2(B) and 2(C).

If the larger portion 14 is taken as, for example, rotating about shaft 8 in the direction indicated by the arrow ⊗, that is, moving from the front of the page around to the back, the surrounding oil 18 would also display an overall rotational flow component in the same direction, and the rotational flow would have a flow component radially following the wall of the space 15 (arrow "f"). If the angular velocity of the larger portion 14 is taken as being "w", the rotational speed of flow of the oil, while varying according to the type of oil, would be in the order of w/2, and there would also be a corresponding change in the kinetic energy of radial component "f".

When the revolving speed of the larger portion 14 is low, so that therefore the energy and speed of flow of the radial component "f" are also low, the space between the shaft 8 and the axially arranged space 12 which acts as the bearing of the shaft 8 is sealed in accordance with the designed sealing effect, and the sealing effect of the small disc (FIG. 2(A)) is also satisfactory. Expressed differently, the conventionally used design criteria were based on a static situation and as there was insufficient dynamic analysis such as described in the present invention, it amounts to planning for use in low speed conditions.

In actual use, however, the larger portion may rotate at quite high speeds so that the radial component "f" of the oil attains a considerable kinetic energy. The result in such a case would be that the oil flow component "f" would overcome the sealing effect existing between the shaft 8 and the bearing space 12, producing an axial leak component L, which would give rise to the same action at the small disc 16, and thereby to axial leakage from the opening 13. Reduced torque is inevitable when there is leakage of oil, which dramatically reduces the efficient performance of the damping device.

To overcome these faults dimensional improvements are made relating to shaft and bearing space and to the small disc and its opposing wall, or by use of rolling, for example, providing a high-quality bearing structure and exercising an equivalent degree of consideration; however, in the type of application the damping devices shown here are used for, to demand such machining precision is nonsensical. The worth of these types of damping device derives from their being relatively inexpensive and the ease of forming and manufacture.

And again, imprecise machining affects the axial alignment of shaft 8 so that an operating situation can be easily envisaged where, as shown by the arrow "R" in FIG. 2(A), the axis pivots about a certain point. However, here also such motion has to be tolerated in this kind of inexpensive and simple device.

Heretofore, when this type of oscillating motion of shaft 8 occurred, the tip of the larger portion 14 would be caused to move reciprocally as indicated by "R" and the lines of FIG. 2(C) indicating the real and hypothetical, a motion which resulted in the oil being subjected to an action indentical to that of a piston. Thus, leak component L was subjected at the least to an actively expressive force.

The result of the above analysis was the damping device of the present invention, a proposed embodiment of which is shown in FIG. 3. Specifically, with the proposed construction, while retaining the advantages of low cost and simplicity of previous types, adequate sealing can be obtained even if the precision of the machining is poor and even if the shaft axis oscillates.

In this embodiment, a radially-enlarged, sucker-shaped flange 20 with a surface 19 inclined relative to the direction of the axis is provided axially forward of the enlarged portion or portions 14 on the shaft 8. A space 21 to accommodate the flange 20 is formed inside the housing 9 with the front wall 22 of the space 21 being arranged so as to abut the rim portion 23 of the flange 20. While it is desirable that rim 23 and wall 22 be in pressure contact, even without this the sealing effect in actual use is satisfactory due to the reason mentioned herebelow.

Explained with regard to motions, even if, as mentioned above, the rotor 7 and the shaft 8 speed up, so the oil 18 surrounding the larger portions 14 generates an axial component L and oil leaks along the shaft 8, in the present invention, this oil component would follow the sloped surface 19 of the flange 20, having a radial transfer component L, from the centrifugal force. This component would exert pressure on the surface of flange 20, producing a pressing component "F". This component would reach a maximum at the rim 23 of the flange, with this maximum axial pressing component ultimately causing the rim 23 to be actively pressed against the wall surface 22.

As seen from the above, the required sealing power is thereby obtained. What is noteworthy is that the seal construction according to the present invention is directly related to and its sealing strength increases unaided in response to a greater oil leakage component L. So the arrangement is very good, as the greater the oil leakage component the greater the pressing force exerted on flange 20 and the higher the sealing force between the rim 23 and the wall 22.

Also, as explained with reference to FIGS. 2(A) and 2(C), even if the axis of the shaft 8 oscillates through direction "R", as flange 20 is sucker-shaped, its good deformability means that there is no loss of sealing performance when the rim 23 and the wall 22 move during actual operation.

In this embodiment the larger portions 14 and the sucker-shaped flange 20 are shown as being separate, but they can also be integrated. This could mean the provision of the flange 20 only, with oil being inserted only behind the sloped surface 19 thereof. On the other hand, the number of flanges 20 could be increased axially.

Furthermore, in order to prevent the axis wavering off-center, a centering protrusion 24 may be so provided on the rear end of the shaft 8 as to fit precisely into a hole 25 formed for this object in the housing.

The housing 9 may be formed as desired. In the embodiment of this invention, as explained with reference to FIG. 2(A), the two halves 9a and 9b were integrally formed in plastic, joined along a side by a hinge and the hinge folded to bring the halves into mutual alignment. Also, as shown in FIG. 1, a side plate 26 may be formed as part of the housing 9 to permit attachment at the required fixing place 28 by means of screws 27 inserted through holes for said screws.

As is clear from the foregoing explanation, the present invention provides for a damping device for damping the rotation of a rotor which without losing the previous merits of low cost and simplicity, and also without requiring machining efficiency in its manufacture or additional expenses, has adequate oil sealing effectiveness.

From the foregoing it will be appreciated that the objectives which were claimed for this invention at the outset of the description are fully attained by the apparatus shown and described.

Also from the above description of the invention, it will be appreciated that many changes will be made in the apparatus without departing from the scope or spirit of the invention, and that the scope of the invention is to be determined from the scope of the accompanying claim.

What is claimed is:

1. A rotary oil-damping device comprising:
   a shaft having at a forward end thereof a rotor;
   a radially extended damper portion provided on at least one part of said shaft;
   a radially extended sucker-shaped flange provided on said shaft at a position close to the opening of a space in which said shaft is borne, said flange having a surface sloping axially toward said forward end;
   a plastic housing in which said shaft is rotatably supported, said housing being provided with spaces to accommodate said radially extended damper portion and said sucker-shaped flange;
   damping oil provided in said accommodating spaces together with said damper portion and said sucker-shaped flange; whereby the rim of said sucker-shaped flange is kept in pressed contact with the front wall of said accommodating space; and means on the opposite end of said shaft from said rotor cooperating with said housing for centering said shaft relative to said housing.

* * * * *